US012013657B2

(12) United States Patent
Katz et al.

(10) Patent No.: US 12,013,657 B2
(45) Date of Patent: Jun. 18, 2024

(54) PRINTING DRUM MOUNTING SYSTEM

(71) Applicant: Hewlett-Packard Development Company, L.P., Spring, TX (US)

(72) Inventors: Israel Katz, Nes Ziona (IL); Sergey Guralnik, Nes Ziona (IL); Avi Barazani, Nes Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 123 days.

(21) Appl. No.: 17/777,921

(22) PCT Filed: Dec. 13, 2019

(86) PCT No.: PCT/US2019/066189
§ 371 (c)(1),
(2) Date: May 18, 2022

(87) PCT Pub. No.: WO2021/118590
PCT Pub. Date: Jun. 17, 2021

(65) Prior Publication Data
US 2023/0012187 A1 Jan. 12, 2023

(51) Int. Cl.
*G03G 15/00* (2006.01)

(52) U.S. Cl.
CPC ......... *G03G 15/757* (2013.01); *G03G 15/751* (2013.01)

(58) Field of Classification Search
None
See application file for complete search history.

(56) References Cited

U.S. PATENT DOCUMENTS

| | | | | |
|---|---|---|---|---|
| 3,536,397 A * | 10/1970 | Wagner | ................ | G03G 15/751 399/117 |
| 6,219,504 B1 * | 4/2001 | Matsuzaki | ......... | G03G 21/1814 399/92 |
| 6,301,458 B1 | 10/2001 | Mori et al. | | |
| 6,382,837 B1 | 5/2002 | Olbrich et al. | | |

(Continued)

FOREIGN PATENT DOCUMENTS

| | | | |
|---|---|---|---|
| CN | 1782906 A * | 6/2006 | ......... G03G 21/1619 |
| CN | 101090823 A | 12/2007 | |

(Continued)

*Primary Examiner* — Sevan A Aydin

(57) ABSTRACT

A printing drum mounting system and method of assembling the mounting system. The mounting system comprising a rotatable shaft; a first mount and a second mount arrangeable on the shaft to clamp a printing drum therebetween, wherein the first mount comprises a first engaging surface to form a mating contact with a corresponding first end surface of the printing drum and the second mount comprises a second engaging surface to form a mating contact with a corresponding end surface of the printing drum; a double-walled flexure to flexibly mount the first engaging surface and the shaft, the flexure to provide the first engaging surface with a single degree of freedom of axial movement relative to the shaft and to maintain mating contact between the first engaging surface and the first end surface of the printing drum as the printing drum thermally expands and contracts; and a releasable fixing to align and rigidly engage the second engaging surface relative to the shaft.

15 Claims, 12 Drawing Sheets

(56) References Cited

U.S. PATENT DOCUMENTS

| | | | | |
|---|---|---|---|---|
| 6,397,029 | B1 | 5/2002 | Portig | |
| 8,577,245 | B2 | 11/2013 | Awano et al. | |
| 11,198,286 | B2 * | 12/2021 | Verkuijlen | B41F 3/54 |
| 2004/0258432 | A1 * | 12/2004 | Hatori | G03G 21/1839 399/111 |
| 2007/0283828 | A1 | 12/2007 | Wolber et al. | |
| 2013/0129384 | A1 * | 5/2013 | Kim | G03G 21/1825 399/111 |
| 2014/0086622 | A1 * | 3/2014 | Nakashima | G03G 21/1619 399/107 |

FOREIGN PATENT DOCUMENTS

| | | | | |
|---|---|---|---|---|
| JP | 2000-214727 | A | | 8/2000 |
| JP | 2001-125432 | A | | 5/2001 |
| JP | 2001304762 | A | * | 10/2001 |
| JP | 2002006572 | A | * | 1/2002 |
| KR | 10-2012-0011758 | A | | 2/2012 |

* cited by examiner

PRINTING DRUM MOUNTING SYSTEM

BACKGROUND

A printing apparatus includes a printing drum to form a latent printing fluid image.

BRIEF DESCRIPTION OF DRAWINGS

Non-limiting examples will now be described, with reference to the accompanying drawings, in which.

DETAILED DESCRIPTION

During a printing operation, printing fluid may be transferred from a printing fluid supply unit to a printing drum to form a latent printing fluid image on the drum exterior surface. A transfer roller or conveyor may then transfer the latent printing fluid image from the printing drum to a substrate to create a printed image.

For example, a printing apparatus may comprise a liquid electrophotographic (LEP) printing apparatus where the printing fluid supply unit may supply an electrostatic printing fluid. The printing drum may comprise a photoconductive exterior surface. This may be formed, for example, by a photoconductive plate or a photoconductive coating.

A photoconductor charging unit may deposit a substantially uniform static charge on the photoconductive exterior surface. The exterior surface is then exposed to light by an imaging unit to selectively dissipate the static charge and form a latent electrostatic image. The electrostatic printing fluid is attracted to the latent electrostatic image and a latent printing fluid image is formed on the exterior surface of the photoconductive plate.

Figure 1A:
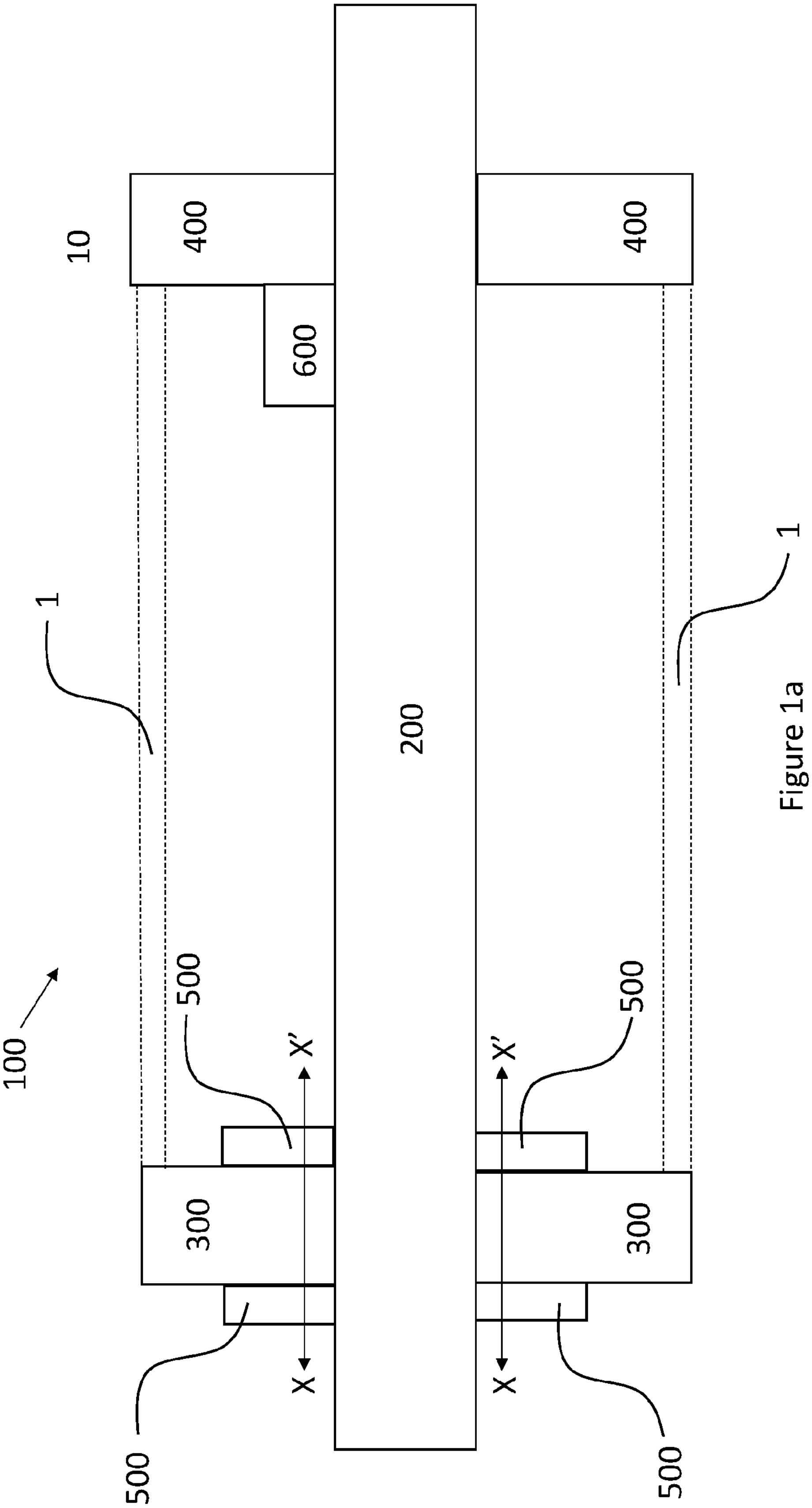
FIGS. 1*a* and 1*b* are simplified cross-sectional schematics of an example of a printing drum mounting apparatus.
Figure 1B:
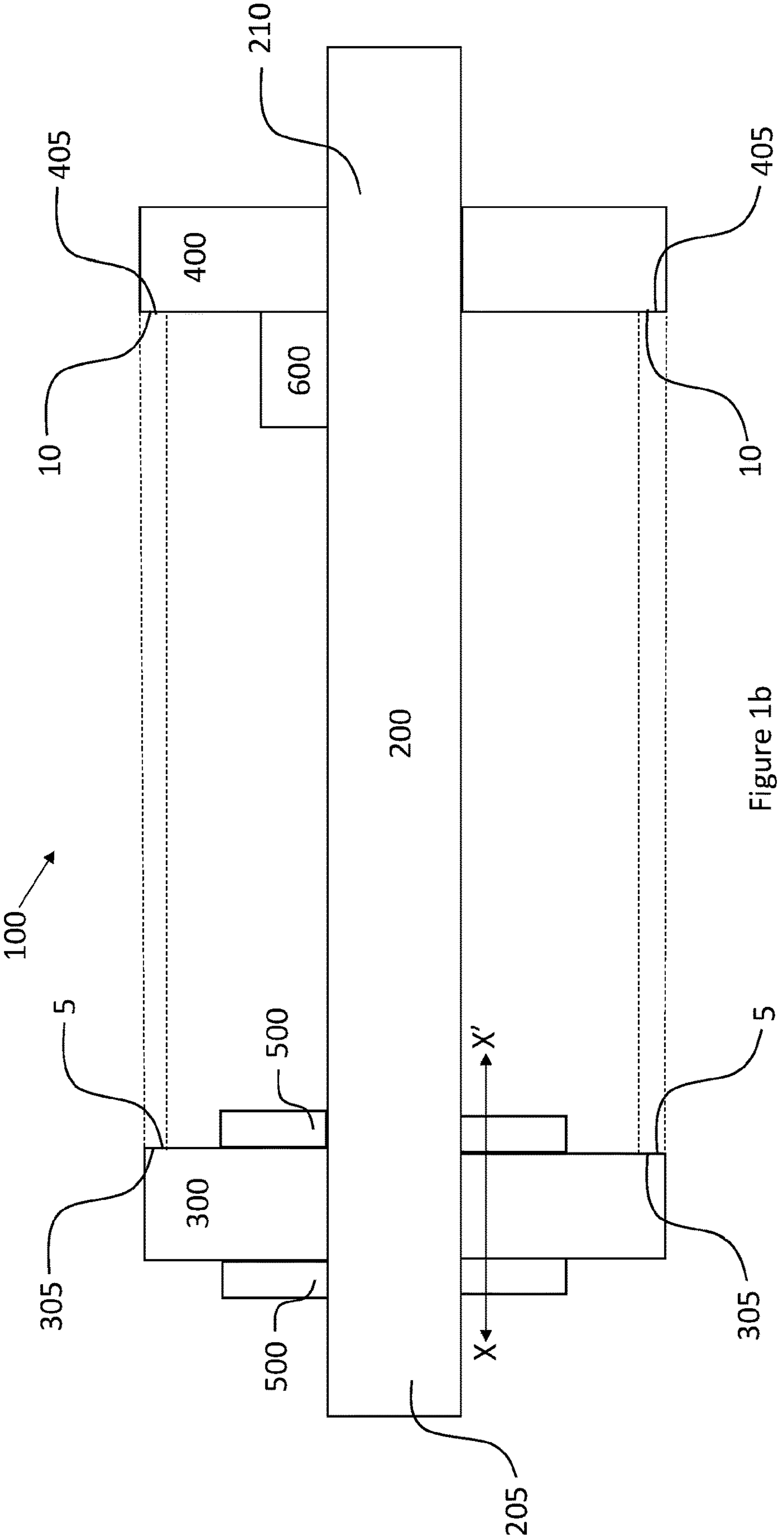

A printing drum may be rotatably mounted in a printing apparatus. FIGS. 1*a* and 1*b* depict an example of a printing drum mounting system. The mounting system 100 comprises a rotatable shaft 200, a first mount 300, a second mount 400, a double-walled flexure 500 and a releasable fixing 600. The mounts are arrangeable on the shaft to clamp a printing drum 1 therebetween.

The first mount 300 may be a flexible mount with a single degree of freedom of movement in an axial direction XX' relative to the shaft 200. The second mount 400 may be a releasable rigid mount. As shown in FIGS. 1*a* and 1*b*, the first mount comprises a first engaging surface 305 to form a mating contact with a corresponding first end surface 5 of the drum. Likewise, the second mount may comprise a second engaging surface 405 to form a mating contact with a corresponding second end surface 10 of the drum.

The shaft 200 and drum 1 may be fabricated from different materials according their design, each having different coefficients of thermal expansion. Hence, during a printing operation, the drum and mounting system may expand and contract differently as the temperature fluctuates. For example, the drum may be composed of aluminium and the shaft may be formed from steel, whereby the coefficient of linear expansion for aluminium is approximately 24 $10^{-6}$ m/mK and steel is approximately 12 $10^{-6}$ m/mK.

The length of the drum may also vary by a manufacturing length tolerance. For example, the length of a drum composed of aluminium may have a manufacturing length tolerance of +/−0.15 mm.

The mounting system comprises a double-walled flexure 500 so that the first mount 300 can flexibly mount the drum 1 and accommodate the differential expansion and contraction between the drum 1 and the shaft 200. The flexure may also accommodate for the manufacturing tolerance of the drum 1.

The double-walled flexure 500 has a single degree of freedom of flexing/bending movement to provide the mount 300 with a single degree of movement in the axial direction XX', parallel to the axis of the shaft 200. The flexure 500 is secured to the first mount 300 and the shaft 200 and forms a flexible engagement between the first mount 300 and the shaft 200. The flexure 500 allows the first mount (including the first engaging surface 305) to move in the axial direction XX' relative to the shaft 200 in response to the thermal expansion and contraction of the drum 1. As a result, the axial position of the first engaging surface 305 of the first mount adjusts to maintain a mating contact with the first end surface 105 of the drum as the drum thermally expands and contracts during a printing operation. Likewise, the flexure 500 allows the first mount, and thereby the first engaging face 305, to move in an axial direction XX' relative to the shaft 200 in response to the manufacturing tolerance of the drum 1. As a result, the axial position of the first engaging surface 305 of the first mount adjusts to form and maintain a mating contact with the first end surface 105 of the drum in accordance with the manufacturing length tolerance of the drum. When the flexure 500 is tensed, the flexure 500 provides an axial clamping force on the drum via the first engaging surface 305. By having a single degree of freedom, the flexure 500 inhibits any non-axial movement of the first mount 300, for example twisting or radial movement of the first mount, and this further provides for accurate mating contact between the first engaging surface 305 of the first mount and the first end surface 105 of the drum. The flexure 500 restricts play between the first mount 300 and the drum 1. By maintaining contact, the flexure impedes drum runout. Slipping or distortion of the image caused by play and/or drum runout is therefore averted.

The mounting system may comprise a releasable fixing 600 to allow the second mount 400 to releasably and rigidly mount the drum 1 relative to the shaft. The fixing 600 provides a rigid engagement between the second mount 400 and the shaft 200 that aligns and restricts movement of the second mount 400 (including the second engaging surface 405) relative to the shaft 200. The fixing 600 is releasable to allow for the manual removal and refitting of the second mount 400 on the shaft 200 during the installation of a drum 1 on the mounting system by an operator. The fixing aligns the second mount at a predetermined position relative to the shaft 200, thereby reducing operator error and improving the accuracy and repeatability of the correct positioning of the second mount 400 on the shaft 200. By aligning and restricting the movement of the second mount (and thereby the second engaging surface 405) relative to the shaft 200, an accurate mating contact is formed between the second engaging surface 405 and second end surface 10 of the drum. The fixing 600 also restricts play between the second mount 400, shaft 200 and drum 1, and drum runout is minimised.

The mounting system 100 mounts a printing drum 1 with very low runout. For example, the mounting system 100 may mount a printing drum 1 with a runout of approximately 10 micron or less than approximately 10 micron. An untrained operator can easily and accurately install a drum 1 with low runout on the mounting system 100.

Figure 2:
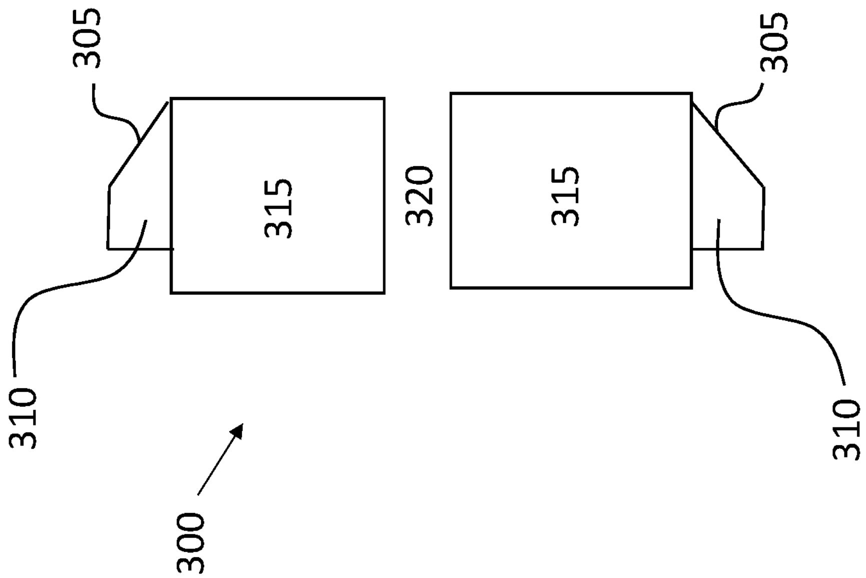
FIG. 2 is a simplified cross-sectional schematic of an example of a first mount of a printing drum mounting apparatus.

In an example of a first mount 300 as shown in FIG. 2, the first engaging surface 305 of the first mount is defined by a first rim 310 encircling a first flange body 315. The flange body 315 may have an aperture 320 through which the shaft can extend to allow for the mounting of the first mount 300 on the shaft. The first rim 310 may be secured to the first flange body 315, for example by press-fitting. Or in some examples, the first rim 310 may be integrally formed with the first flange body 315.

The first rim 310 and first flange body 315 may be formed from the same material, and may be formed from the same material as the shaft. For example, the shaft, first flange body 315 and first rim 310 may be formed from steel.

The first engaging surface 305 may be a peripheral (outer) surface of the first mount. The first engaging surface 305 may be a circumferential surface corresponding to the cylindrical shape of the drum and circumferential first end surface of the drum.

The first engaging surface 305 may be inclined and have a conical profile as shown in FIG. 2 to mate with a first end face of the drum having a corresponding conical profile. In other examples, the first engaging surface may have any other suitable profile to form a mating contact with the first end face of a drum.

Figure 3A:
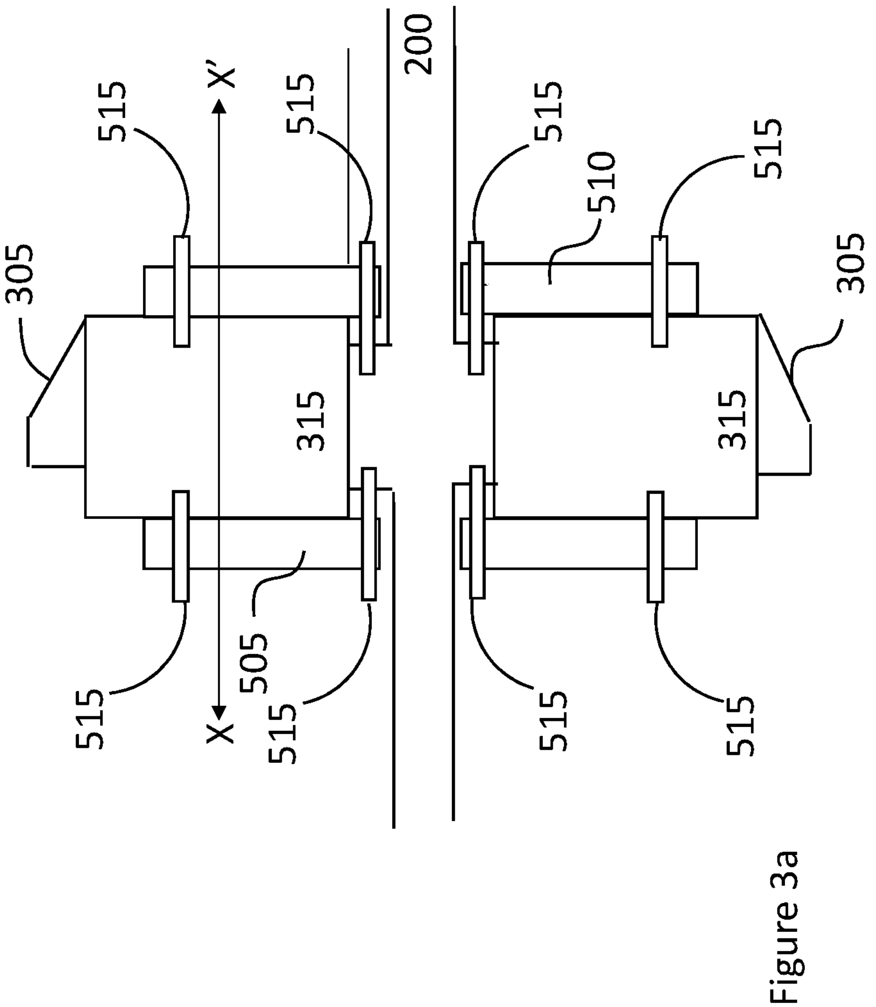
FIGS. 3*a* and 3*b* are simplified cross-sectional schematic of an example of a double-walled flexure and first mount of a printing drum mounting apparatus.
Figure 3B:
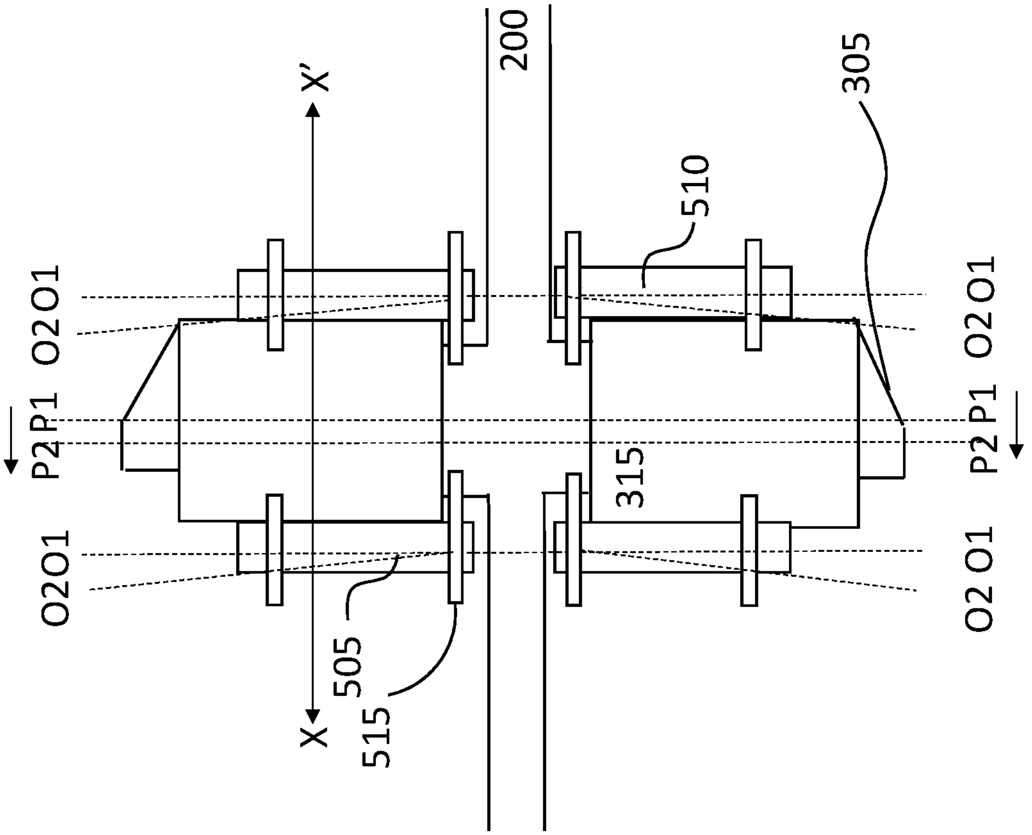

In the example shown in FIGS. 3*a* and 3*b*, the double-walled flexure of the first mount comprises a first flexure plate 505 and a second flexure plate 510. The plates 505, 510 may be arranged on either side of the flange body 315 with the first engaging surface 305, extending in-parallel between the flange body 315 and the shaft 200. The parallel plates 505, 510 may be secured to the flange body 315 and the shaft 200 to flexibly couple the first mount (and thereby the first engaging surface 305) and the shaft. The parallel plates 505, 510 may be secured to the first flange body 315 and the shaft 200 using bolts 515 or any other suitable securing means. Direct connection of the parallel plates 505, 510 between the first flange body 310 and the shaft 200 improves the tolerance of the mounting system by reducing the number of component parts and play. The parallel plates may be formed from spring steel, or any other suitable flexible material. The parallel plates may have slots to control the flexing of the plates in an axial direction (not shown).

In the example shown, the parallel plates 505, 510 may be secured to the flange body 315 and the shaft 200 under tension to provide a residual clamping force on the drum 1 in an axial direction towards the second mount 400 via the first engaging surface 305. In other examples, the parallel plates 505, 510 may be secured to the flange body 315 and the shaft in a neutral position. As the parallel plates 505, 510 flex during a printing operation, tension in the flexed plates provides a clamping force on the drum via the first engaging surface 305.

When secured to the flange body 315 and the shaft 200, the parallel plates 505, 510 have a single degree of freedom of movement whereby the parallel plates are permitted to bend out of the normal plane relative to the shaft axis and are prevented from twisting movement. The parallel plates 505, 510 may allow the first engaging surface 305 to move in an axial direction XX' relative to the shaft 200 by a predetermined displacement according to their design. By way of example, the parallel plates 505, 510 may allow the engaging surface 305 to move in an axial direction XX' relative to the shaft by up to approximately 2 mm. The parallel plates 505, 510 may have a first orientation O1 relative to the shaft 200 when the drum 1 is at a minimum temperature and has a minimum axial length, and a second orientation O2 relative to the shaft 200 when the drum 1 is at a maximum temperature and has a maximum axial length. When the parallel plates 505, 510 are in the first orientation O1, the first engaging surface 305 may have a first axial P1 position relative to the shaft. When the parallel plates 505, 510 are in the second orientation, the first engaging surface 305 may have a second axial position P2 relative to the shaft. The plates may allow the first engaging surface 305 to move in an axial direction XX' relative to the shaft 200 between the first axial position P1 and the second axial position P2 as the temperature of the printing drum fluctuates. For example, the first engaging surface may have an axial displacement range between P1 and P2 of 0.2 mm over a temperature change of 24K As the printing drum 1 heats and expands during a printing operation, the increased force of the drum acting on the first mount 300 may cause the parallel plates 505, 510 to bend axially away from the second mount, and to the second orientation O2, thereby moving the first engaging surface 305 axially relative to the shaft and away from the second mount to the second axial position P2. The axial adjustment of the first engaging surface 305 between the first position P1 and the second position P2 may be commensurate with and compensate for the increasing length of the drum during to thermal expansion. The axial adjustment enables the first engaging surface 305 of the first mount to maintain an engaging contact with the first end surface of the drum when expanding during heating, and when fully expanded.

As the printing drum 1 cools and contracts, the reducing force of the drum acting on the first mount 300 may allow the parallel plates 505, 510 to return to their first orientation O1 thereby moving the first engaging surface 305 axially relative to the shaft and towards the second mount to the first axial position P1. The axial adjustment of the first engaging surface 305 between the second position P2 and the first position P1 may be commensurate with and compensate for the reducing length of the printing drum. The axial adjustment allows the first engaging surface 305 of the first mount to continue to maintain an engaging contact with the first end of surface 405 of the drum when contracting during cooling, and when fully contracted.

The parallel plates 505, 510 allow the mounting system to maintain a mounting contact with drum 1 over the entire temperature range of the printing operation, for example between approximately 24° C. and 45° C. By maintaining contact the drum 1 remains clamped between the first and second mounts and drum runout is avoided.

Due to their single degree of freedom of bending, the parallel plates 505, 510 also prevent any movement of the first engaging surface 305 in non-axial directions relative to the shaft, which further improves mating contact with the printing drum and inhibits drum runout.

Figure 4:
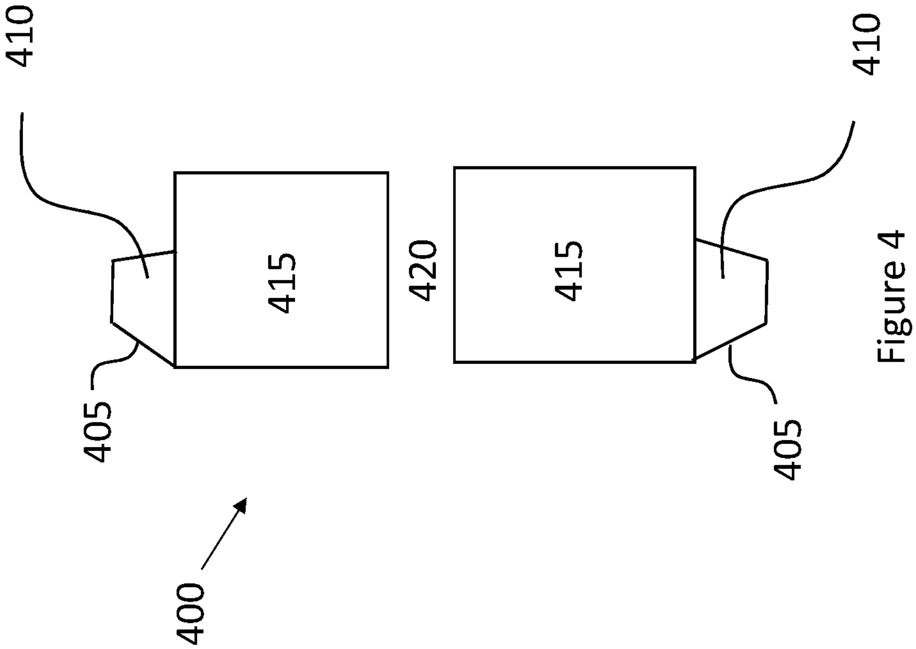
FIG. 4 is a simplified cross-sectional schematic of an example of a second mount of a printing drum mounting apparatus.

In an example of a second mount 400 as shown in FIG. 4, the second engaging surface 405 of the second mount may be defined by a second rim 410 encircling a second flange body 415. The flange body 415 may have an aperture 420 through which the shaft can extend to allow for the mounting of the second mount 400 on the shaft. The second rim 410 may be secured to the second flange body 415, for example by press-fitting. In some examples, the second rim 410 may be integrally formed with the second flange body 415.

The second rim 410 and second flange body 415 may be formed from the same material, and may be formed from the same material as the shaft. For example, the shaft, second flange body 415 and second rim 410 may be formed from steel.

The second engaging surface 405 may be a peripheral (outer) surface of the second mount 400. The second engaging surface 405 may be a circumferential surface corresponding to the cylindrical shape of the printing drum 1 and circumferential second end surface of the printing drum. The second engaging surface 405 may be inclined and have a conical profile as shown in FIG. 4, or any other suitable shape for mating contact with the second end surface 10 of the drum.

In an example, the releasable fixing 600 may comprise a releasable aligning mechanism to interconnect and align the second mount 400 relative to the shaft 200 and a releasable locking mechanism to lock the second mount 400 relative to the shaft 200. When the second mount and shaft are aligned and locked, the second engaging surface 405 may have a fixed orientation and position relative to the shaft, and the second mount 400 and shaft 200 may form a rigid structure.

Figure 5:
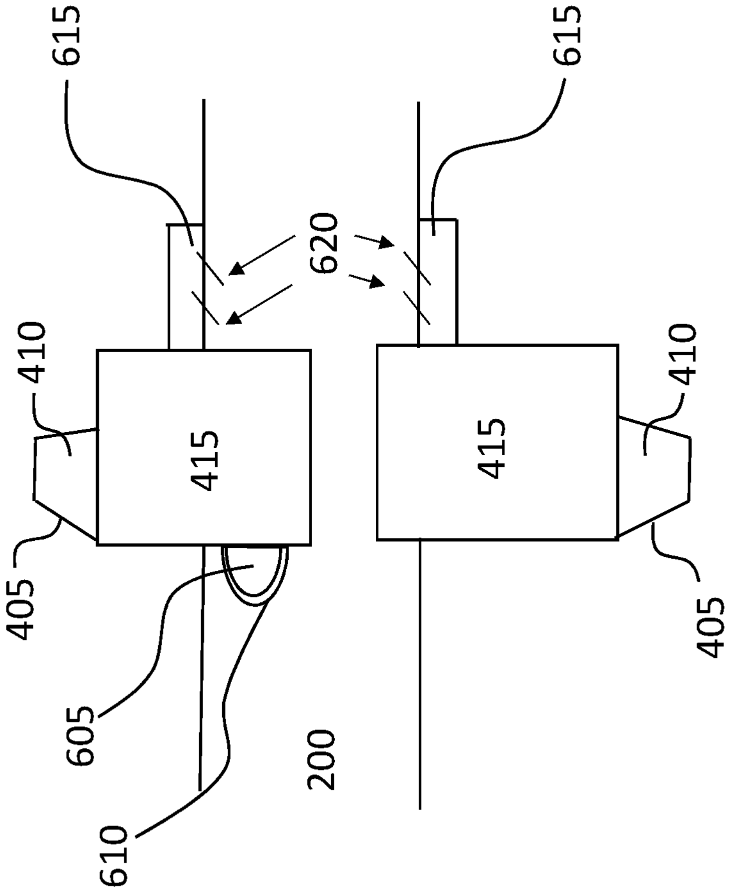
FIG. 5 is a simplified cross-sectional schematic of an example of a releasable fixing of a printing drum mounting apparatus.

The aligning mechanism may axially and/or radially align the second mount 400 relative to the shaft 200. In an example shown in FIG. 5, the releasable fixing 600 comprises an aligning mechanism having a protrusion 605 extending from the second flange body 415 or shaft 200, and an indent 610 arranged on the corresponding shaft or second flange body in which the protrusion 605 can be releasably received when the second flange body 415 is arranged and aligned on the shaft 200. As shown in FIG. 5, the protrusion 605 extends in an axial direction from the second flange body 415. In another example, the protrusion 605 may extend in a radial direction from the second flange body 415. The protrusion 605 and indent 610 may have a corresponding convex and concave shape as shown in FIG. 5, or any other shape suitable to form an engagement. In the example shown, the protrusion may be integrally formed with the second flange body. In other examples, the protrusion may be coupled to the second flange body. The cooperating features of the aligning mechanism can be to precisely cooperate to improve the accuracy and repeatability of arranging of the second mount 400 on the shaft 200 and this, in turn, may improve the mounting of the second end face of the drum on the second engaging surface 405. When the axial protrusion is received in the indent, relative rotational and translation movement between the second mount 400 and the shaft 200 is restricted, which helps to constrict play of the mounting system and drum runout.

In the example shown in FIG. 5, the releasable fixing comprises a locking mechanism having a collar 615 arrangeable on the shaft to abut the second flange body 415 against the shaft 200 thereby locking the axial position of the second flange body relative to the shaft. When locked, the protrusion 605 is secured in the indent 610 and movement of the second mount 400 relative to the shaft 200 is prevented. The collar 615 may be releasably engageable by a twisting action to securely engage it on the shaft 200 and axially lock the second flange body 415. The collar may include teeth 620 on an inner surface of the collar to align the collar on the shaft and to aid the gripping of the collar on the shaft 200.

In an example of the mounting system 100, the shaft may have a distal end 205 and a proximal end 210. The first mount 300 may be arranged at a distal end region of the shaft and the second mount 400 may be arranged at the proximal end region of the shaft. The first and second mounts may respectively hold the rear end 15 and front end 20 of the drum. The distal and proximal ends of the shaft, and rear and front ends of the drum, may be defined according to their proximity to an operator during the installation of the drum on the mounting system.

Figure 6:
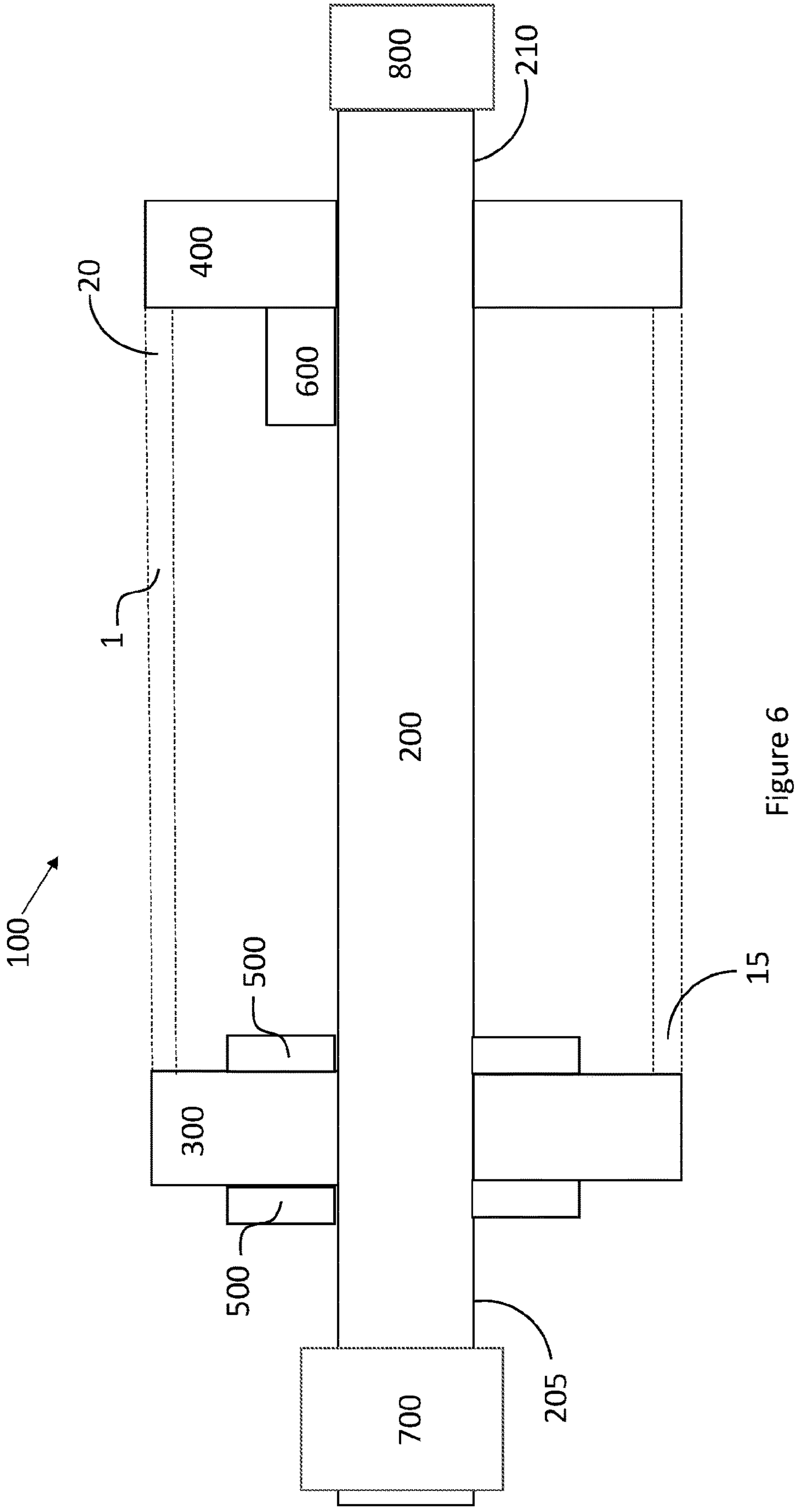
FIG. 6 is a simplified cross-sectional schematic of an example of a printing drum mounting apparatus coupled to a motor and a support.

In the example shown in FIG. 6, the distal end 205 of the shaft may be coupled to a motor 700 or any other suitable actuator to drive the shaft and mounted drum to rotate. The shaft may comprise a bearing surface (not shown) to form an engaging contact with a corresponding driving surface of the motor. A proximal end 210 of the shaft may be coupled to a support 800. Supporting the shaft 200 at both the distal and proximal ends 205, 210 of the shafts improves the alignment of the shaft and, in turn, improves the mounting of the drum 1 on the mounting system 100.

Figure 7:
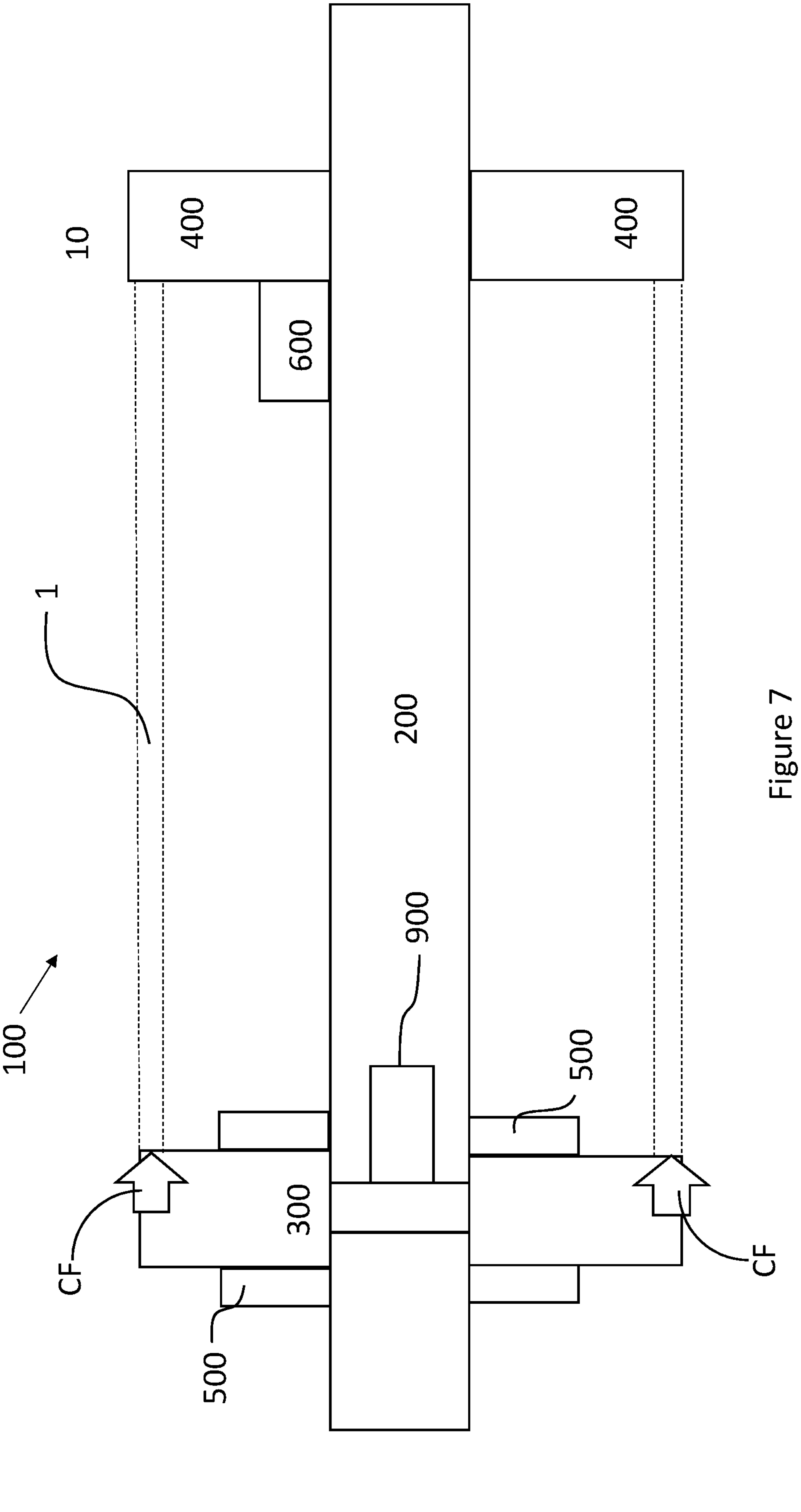
FIG. 7 is a simplified cross-sectional schematic of an example of a biasing member of a printing drum mounting apparatus.

The mounting system may comprise a biasing member to provide a clamping force of the mounting system. For example, as shown in FIG. 7, the mounting system may comprise an axial spring 900 coupled between the shaft 200 and the first mount 300, to bias the first mount, and thereby the first engaging surface 305, towards the second mount 400. By biasing the first mount 300 in a direction towards the second mount 400, the axial spring 900 increases the clamping effect on the drum. Together the double-walled flexure 500 and the elastic member control the clamping force CF applied to the printing drum to maintain the mounting of the printing drum whilst accommodating expansion and contraction of the drum.

Figure 8:
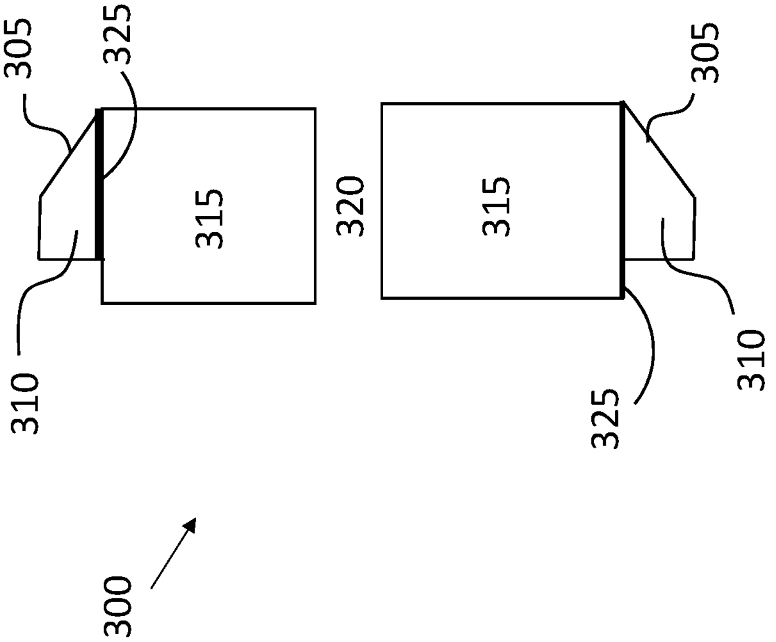
FIG. 8 is a simplified cross-sectional schematic of an example of a first mount with an isolator of a printing drum mounting apparatus.
Figure 9:
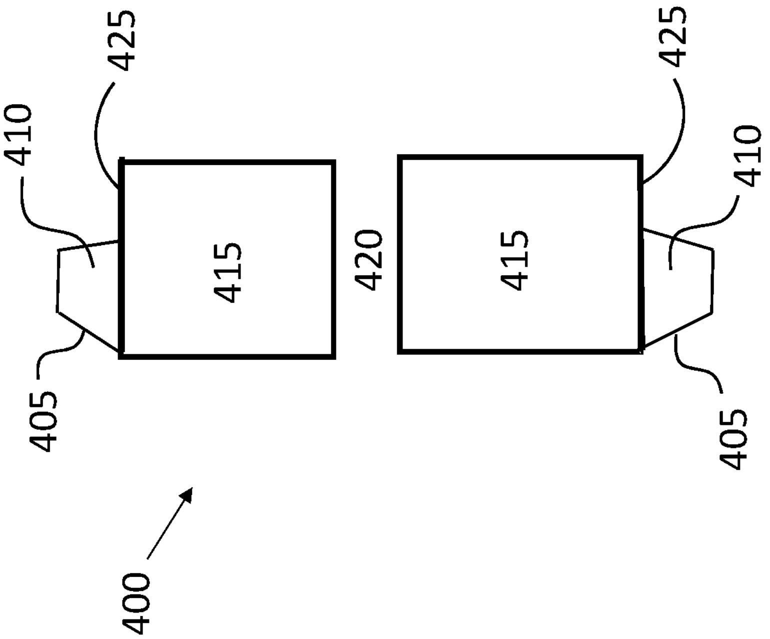
FIG. 9 is a simplified cross-sectional schematic of an example of a second mount with an isolator of a printing drum mounting apparatus.

If the drum has a photoconductive exterior surface that is charged to form an electrostatic image, the mounting system may comprise an isolator to inhibit the transfer of electrical charge from the drum to the mounting system. The isolator may be an electrically non-conducting member, layer or coating. The first mount may comprise a first isolator and the second mount may comprise a second isolator. The isolator may be arranged on the engaging surfaces, rim and/or flange body of the mount. In the example shown in FIG. 8, the first mount 300 has a first isolator comprising a non-conductive ceramic coating 325 applied to the underside of the first rim 310 to electrically isolate the first rim 310 from the first flange body 315. In the example shown in FIG. 9, the second mount has a second isolator comprising a non-conductive ceramic coating 425 applied to the second flange body 415 in order to electrically isolate the second mount 400 from the drum.

Figure 10:
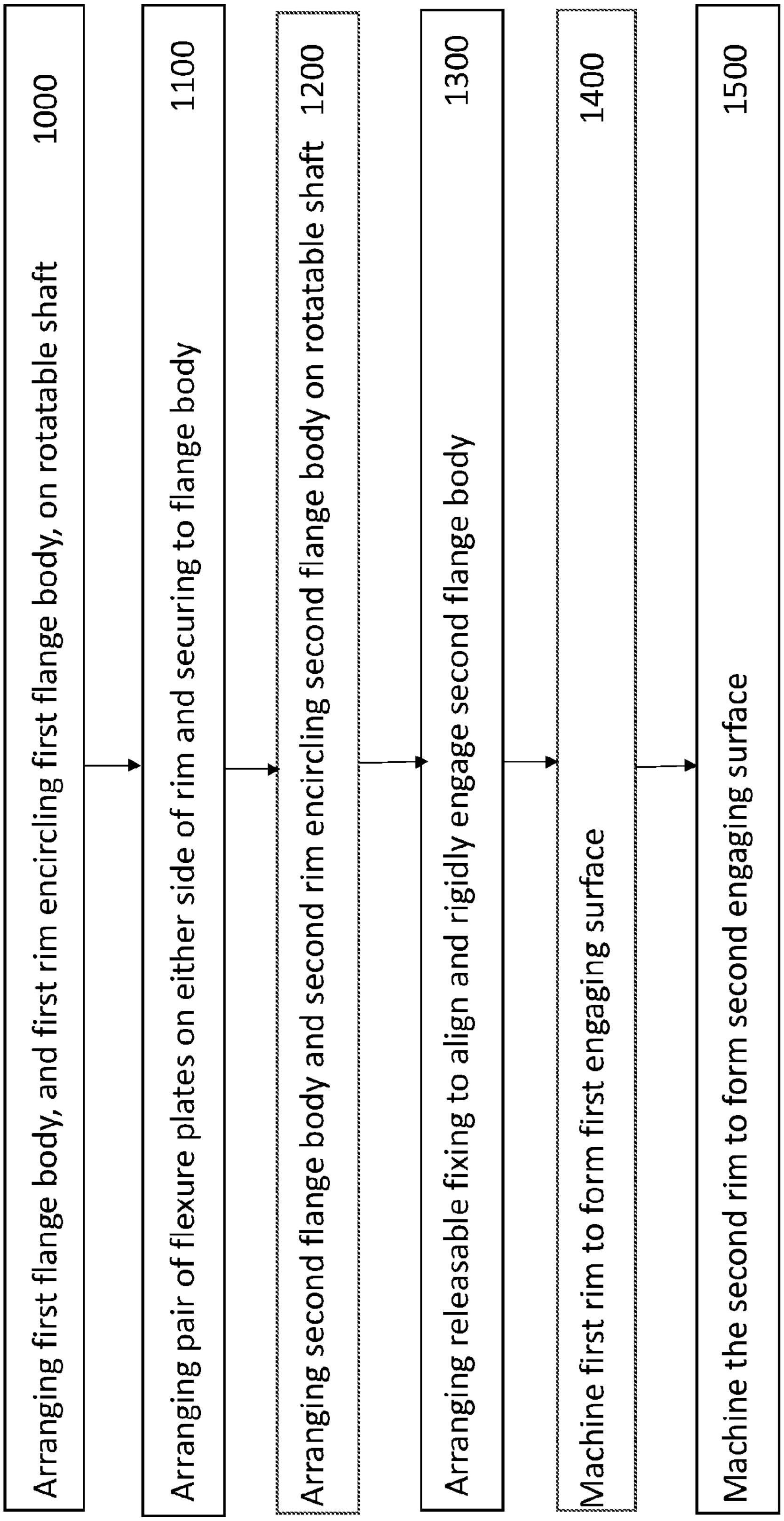
FIG. 10 is a flowchart of an example of a method of assembling a printing drum mounting apparatus.

An example of a method of assembling the printing drum mounting system is shown in FIG. 10. In block 1000, a first flange body and a first rim encircling the first flange body are arranged on a rotatable shaft. In block 1100, a pair of flexure plates are arranged on either side of the first rim and secured to the first flange body and the shaft, whereby the flexure plates provide the first rim with a single degree of freedom of axial movement relative to the shaft. In block 1200, a second flange body and a second rim encircling the second flange body are arranged on the rotatable shaft. In block 1300, the second flange body and the shaft are rigidly engaged with one another by a releasable fixing. The first rim and the second rim are then machined to form a respective first engaging surface and a second engaging surface in blocks 1400, 1500. The first engaging surface and second engaging surface are to form a mating contact with a corresponding first end surface and a second end surface of a drum when installed on the mounting system. By forming the first and second engaging surfaces when the flange bodies and rims are arranged in-situ on the shaft, the formation of the engaging surfaces is more accurate and the tolerance of the mounting system is thereby improved. By enhancing tolerance, the play of the mounting system and drum runout are restricted.

Arranging a releasable fixing may comprise locating a protrusion into an indent between the second flange body and the shaft to align the second mount relative to the shaft, and arranging a locking collar on the shaft to set the axial position of the second flange body on the shaft and secure the protrusion in the indent.

A surface region of the shaft may be machined to form a bearing surface. The bearing surface is intended to form a mating contact with a corresponding driving surface of a driving motor. The tolerance of the mounting system is improved by machining the bearing surface in association with the machining of the engaging surfaces, and this restricts play between the mounting system components and runout of the drum.

The first rim, second rim and shaft surface may be machined by grinding, cutting, and/or by using a Computer Number Control (CNC) device.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A printing drum mounting system comprising:

a rotatable shaft;

a first mount and a second mount arrangeable on the shaft to clamp a printing drum therebetween, wherein the first mount comprises a first engaging surface to form a mating contact with a corresponding first end surface of the printing drum and the second mount comprises a second engaging surface to form a mating contact with a corresponding second end surface of the printing drum;

a double-walled flexure to flexibly engage the first engaging surface and the shaft, the flexure to provide the first engaging surface with a single degree of freedom of axial movement relative to the shaft and to maintain mating contact between the first engaging surface and the first end surface of the printing drum as the printing drum thermally expands and contracts; and a releasable fixing to align and rigidly engage the second engaging surface relative to the shaft.

2. The mounting system as claimed in claim 1, wherein the releasable fixing comprises:

a protrusion extending from the second mount or the shaft;

an indent correspondingly formed on the shaft or the second mount in which the protrusion can be received when the second mount and the shaft are aligned;

a releasable locking collar arrangeable on the shaft to abut the second mount against the shaft and secure the protrusion in the indent.

3. The mounting system as claimed in claim 1, wherein the rotatable shaft comprises a distal end and a proximal end, wherein the distal end is connectable to a motor to rotatably drive the shaft, and the proximal end is locatable in a support.

4. The mounting system as claimed in claim 1, further comprising a biasing member to bias the drum, via the first engaging surface of the first mount, towards the second engaging surface.

5. The mounting system as claimed in claim 1, wherein the first engaging surface has conical profile.

6. The mounting system as claimed in claim 1, wherein the second engaging surface has a conical profile.

7. The mounting system as claimed in claim 1, wherein the double-walled flexure is to flex to permit movement of the first engaging surface in an axial direction between a first axial position and a second axial position relative to the shaft corresponding to thermal expansion of the drum from a first length to a second length.

8. The mounting system as claimed in claim 1, wherein the double-walled flexure is to flex to permit movement of the first engaging surface in an axial direction relative to the shaft corresponding to a manufacturing length tolerance of the drum to form mating contact between the first engaging surface and the first end surface of the printing drum.

9. The mounting system as claimed in claim 1, further comprising an isolator to electrically isolate the mounting system from the drum.

10. A printing drum mounting system comprising:

a rotatable shaft;

a first mount comprising:

a first flange body arrangeable on the shaft;

a first rim encircling the first flange body, the first rim having a first engaging surface to form a mating contact with a corresponding first end surface of a printing drum;

a second mount comprising:

a second flange body arrangeable on the shaft;

a second rim encircling the second flange body, the second rim having a second engaging surface to form a mating contact with a corresponding second end surface of the printing drum;

a double-walled flexure having a first flexure plate and a second flexure plate arrangeable on either side of the first rim to flexibly engage the first engaging surface and the shaft, the double-walled flexure to provide the first engaging surface with a single degree of freedom of axial movement relative to the shaft to allow the first engaging surface to move axially relative to the shaft while maintaining mating contact with the first end surface of the printing drum;

a releasable fixing to align and rigidly engage the second engaging surface relative to the shaft.

11. The printing drum mounting system as claimed in claim 10, further comprising a biasing member to bias the drum, via the first engaging surface of the first mount, towards the second engaging surface of the second mount.

12. The printing drum mounting system as claimed in claim 10, wherein the double-walled flexure is to flex to permit movement of the first engaging surface in an axial direction relative to the shaft to accommodate a thermal length expansion and contraction of the drum and to accommodate a manufacturing length tolerance of the drum.

13. A method comprising:

arranging a first flange body and a first rim encircling the first flange body on a rotatable shaft;

arranging a pair of flexure plates on either side of the first flange body and securing them to the first flange body and the shaft, the flexure plates providing a single degree of freedom to the first rim for axial movement relative to the shaft;

arranging a second flange body and a second rim encircling the second flange body on the shaft;

arranging a releasable fixing to align and rigidly engage the second flange body and the shaft;

machining the first rim to form a first engaging surface for mating with a first end surface of a printing drum; and machining the second rim to form a second engaging surface for mating with a second end surface of a printing drum.

14. The method as claimed in claim 13, further comprising:

machining a surface region of the shaft to form a bearing surface for mating with a driving surface of a motor.

15. The method as claimed in claim 13, wherein arranging a releasable fixing comprises:

locating a protrusion in a cooperating indent between the second flange body and the shaft when the second flange body and shaft are aligned;

arranging a locking collar on the shaft to abut the second flange body and fix the second flange body on the shaft, securing the protrusion in the indent.

* * * * *